United States Patent [19]
Houst et al.

[11] 3,818,687
[45] June 25, 1974

[54] ROTARY LAWN MOWER DISCHARGE CHUTE SAFETY DEFLECTOR

[75] Inventors: Douglas R. Houst, Pattersonville; Kenneth R. Jones, Elnora, both of N.Y.

[73] Assignee: General Electric Company, Erie, Pa.

[22] Filed: Apr. 9, 1973

[21] Appl. No.: 349,556

[52] U.S. Cl.................. 56/320.2, 56/13.8, 56/17.5, 56/255
[51] Int. Cl............................................ A01d 67/00
[58] Field of Search ........ 56/320.2, 255, 16.4, 17.4, 56/17.5, 13.6, 13.7, 13.8

[56] References Cited
UNITED STATES PATENTS

| | | | |
|---|---|---|---|
| 2,898,723 | 8/1959 | Goodall | 56/13.6 |
| 3,413,783 | 12/1968 | Gordon | 56/320.2 |
| 3,485,018 | 12/1969 | Beckering et al. | 56/13.6 |
| 3,503,194 | 3/1970 | Ritums | 56/255 |
| 3,646,740 | 3/1972 | Grimes | 56/320.2 |
| 3,648,445 | 3/1972 | Efflandt | 56/320.2 |
| 3,706,189 | 12/1972 | Rutherford | 56/320.2 |
| 3,729,911 | 5/1973 | Dahl et al. | 56/320.2 |

*Primary Examiner*—Russell R. Kinsey
*Attorney, Agent, or Firm*—Dana F. Bigelow; Walter C. Bernkopf

[57] ABSTRACT

A V-shaped guard plate is mounted in the mower discharge chute with its vertex toward the inside and its legs diverging toward the front and rear walls of the lateral chute to form side openings to the outside. The resulting pair of diverging paths provide for the conduction of lightweight grass clippings out the side openings but prevent heavier objects such as stones from being discharged to harm surrounding people or property. Further, the plate restricts the operator's accidental access to the blade path portion of the discharge chute.

7 Claims, 3 Drawing Figures

ROTARY LAWN MOWER DISCHARGE CHUTE SAFETY DEFLECTOR

BACKGROUND OF THE INVENTION

This invention relates generally to power mowers and more specifically to mechanical guard devices for power mowers of the rotary type.

The rotary power mower has become a popular implement which is no longer a luxury but almost a necessity for the average family. Although the mowers offer a significant improvement over the prior art in regard to efficiency and performance, the number of injuries which result to the operators thereof is ever increasing. As is true with most powered devices, there are inherent dangers which exist in the machines, and their design has accordingly been modified to minimize the risk associated with the use thereof.

A rotary lawn mower generally has an inverted cup shaped housing on which is supported an electric or gasoline engine for rotating a blade in a horizontal plane within the housing. The housing is designed to shroud the blade area to protect the operator from harm and improve air movement to aid grass discharge. It acts to reduce the risk of the operator's inadvertent placing of his hand or foot in the path of the blade, and also tends to reduce the amount of debris that is thrown outwardly by centrifugal force. This debris includes rocks, nails, and other foreign objects which pose a significant danger to the operator as well as to bystanders. Greatest safety is provided by a housing which completely shrouds the blade so as to prevent the discharge of any material. However, with such a design the moist grass clippings would build up within the housing to impair efficiency and eventually cause stoppage of the cutting blade. A compromise must therefore be made to allow for the discharge of grass clippings outside the housing and yet not allow for the uncontrolled discharge of foreign objects to the detriment of the operator.

Discharge of grass clippings is generally provided for at one side of the mower housing or the rear and is commonly facilitated by a discharge chute communicating with the blade path and extending laterally to direct the clippings beyond the mower housing. Various guard devices have been attached to the exterior or interior of the chute structure to protect the operator from the dangers mentioned above. However, it has been difficult to obtain both the desired protection from the harmful discharge of debris and the desired degree of clippings discharged. Generally, one has been sacrificed for the other.

It is therefore an object of this invention to provide an improved guard device for a power rotary mower.

Another object of this invention is the provision for a guard device which substantially curtails the discharge of foreign objects from the discharge chute and prevents the entry therein of an operator's or bystander's appendages.

Yet another object of this invention is the provision for a rotary mower guard device which allows for the free discharge of grass cuttings from a discharge chute.

Still another object of this invention is the provision for a power mower guard device which is economical to manufacture, simple to install and extremely effective in use.

These objects and other features and advantages become more readily apparent upon reference to the following description when taken in conjunction with the appended drawings.

SUMMARY OF THE INVENTION

Briefly, in accordance with one aspect of the invention, a V-shaped plate is secured to the upper wall of the lateral discharge chute, with its vertex disposed inwardly and its sides extending outwardly toward the sides of the chute to substantially close off the discharge opening except for a pair of side openings at the front and rear ends thereof. A pair of diverging paths are thereby defined from the internal portion of the chute through which the cutting blade passes, through the side openings, and outside the mower housing. Lightweight, high velocity grass clippings are easily projected outwardly along either of the diverging paths, whereas heavier foreign objects, which will not accept this sudden change in direction, are projected against the plate and deflected to the ground below. The plate is canted from an orthogonal position with its outer side forming an acute angle with the chute upper wall. A small portion of the grass clippings are projected against the plate and deflected downwardly in a manner similar to that of foreign objects, but a majority of them are carried along the air flow currents of either of the diverging paths to exit from the unrestricted side openings. The plate in addition to substantially curtailing the far reaching discharge of foreign objects restricts the entry of an operator's hand or foot into the discharge chute.

DESCRIPTION OF THE PREFERRED EMBODIMENT

Figure 1:
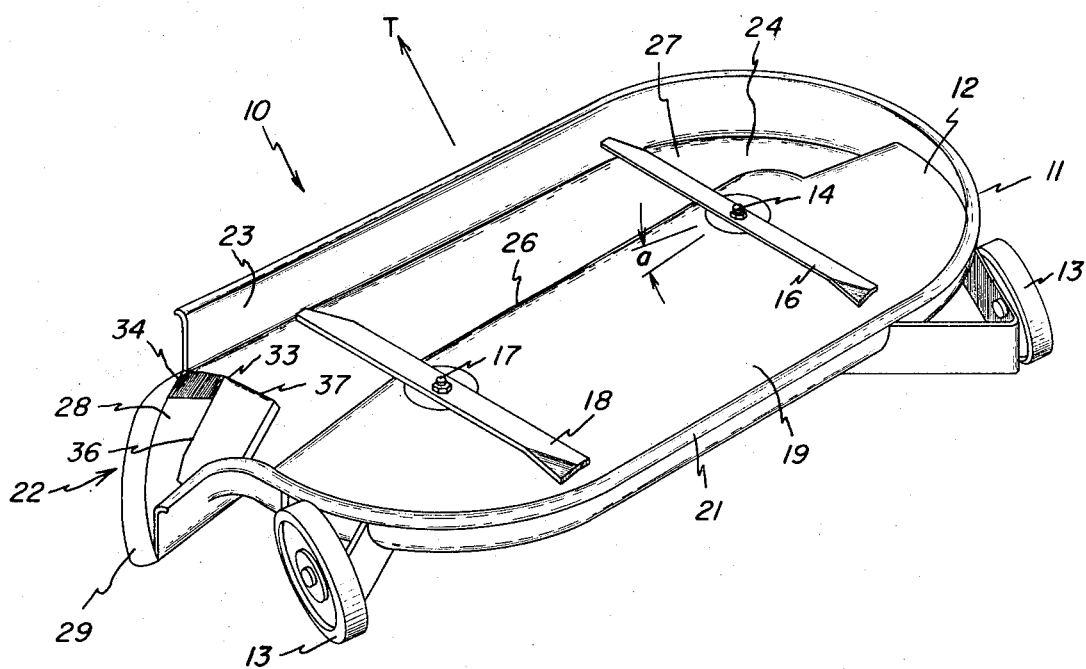
FIG. 1 is a perspective view of the underside of a mower having a guard plate attached thereto in accordance with the preferred embodiment of the invention.

Referring now to FIG. 1, the invention is shown generally at 10 as used in combination with a standard power mower 11 having a housing 12 supported by a plurality of ground engaging wheels 13 and propelled along a path either by the operator or by a power driven mechanism. In arrangements of the latter type, the mower portion may be front-end mounted, mid-mounted or trailing with respect to the propelling vehicle. However, in any case it is common to have at least one ground engaging wheel 13 or skid mounted to the mower housing 12 to provide height adjustment thereof when operating on uneven terrain.

Mounted on the upper side of the housing 12 is a motor (not shown) of the electrical or internal combustion type which drives a vertical shaft 14 extending down through the housing 12. A cutting blade 16 is attached thereto and is adapted to be rotated thereby in a horizontal plane to cut the grass which is continuously exposed by movement of the mower in the direction indicated by the arrow T in FIG. 1. In the embodiment of FIG. 1 a second shaft 17 and attached blade 18 are included and operate in a similar manner to provide additional cutting action. It should be noted that the subject invention is applicable with either a single blade apparatus or a multi-blade apparatus as shown. With the latter arrangement it is preferable to have the respective shafts 14 and 17 offset from the plane orthogonal to the direction of travel T by an angle $a$ to provide overlap without the necessity of synchronism.

The housing 12 comprises a flat substantially horizontal platform 19 with an integral depending peripheral skirt 21. The skirt 21 extends downwardly to a level below that of the blades so as to afford protection from objects being projected outwardly. To provide an escape path for the grass clippings to be discharged from the housing, a discharge chute 22 is formed in the housing in a substantially lateral disposition with respect to the direction of mower travel. The chute 22 comprises a forward wall 23 which is part of the skirt, 21, an upper wall 24, and a rear wall, 26. The blades 16 and 18 pass through a portion of the chute as they rotate in a direction from its intake end 27 towards its discharge end 28 (counterclockwise as seen from the buttom). At the discharge end 28 there is a discontinuance of the skirt 21 and therefore the existence of an opening through which grass clippings may be discharged from the housing. The chute 22 preferably extends laterally beyond the general configuration of the housing and may have an extension plate 29 attached to the upper wall thereof by bolts 31 and 32 to further that purpose.

The slope of the chute walls 23, 26 is preferably divergent toward the discharge end 28 with the forward wall 23 substantially in a single plane canted rearwardly with respect to the lateral plane at an angle $b$. The rear wall 26 is preferably slightly divergent therewith near its intake end and then angles to a greater divergence near its discharge end. It should be understood that various discharge chute arrangements may be utilized without departing from the true spirit and scope of this invention.

Figure 3:
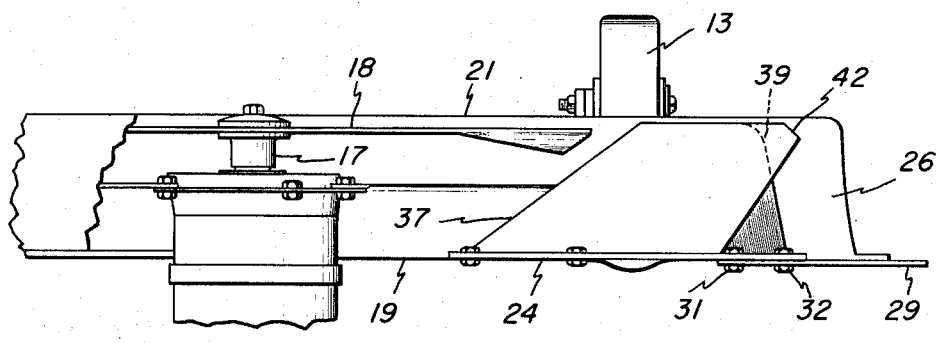
FIG. 3 is a sectional view thereof as seen along line 3—3 in FIG. 2.

Disposed in the discharge chute 22 in semipermanent installation is a guard plate 33 which acts both as a device to prevent easy access to the blade area of the discharge chute and as a device to prevent the uncontrolled discharge of foreign objects into the vicinity in which the operator or bystander may be standing. The plate 33 comprises first and second elements 34 and 36 integrally connected at an oblique joint 37 to form a V-shaped structure for directing the flow of air and included material along the course of the chute from its intake end 27 toward its discharge end 28. The elements 34 and 36 each have parallel upper and lower edges 38 and 39, and 41 and 42 respectively. The upper edges 38 and 41 are secured in contiguity with the chute upper wall 24 by tabs 43, 44, and 46 which are fastened to the upper wall by bolts 31, 32, 47 and 48. The lower edges 39 and 42 are principally in a plane level with the lower edge of the skirt 21, with the lower edge 39 sloping outwardly at its free end and the lower edge 42 sloping inwardly at its free end. The joint 37 is in a plane which forms an acute angle with the chute upper wall in a direction towards the discharge end thereof (FIG. 3), thereby providing for the smooth flow of air around the plate.

Figure 2:
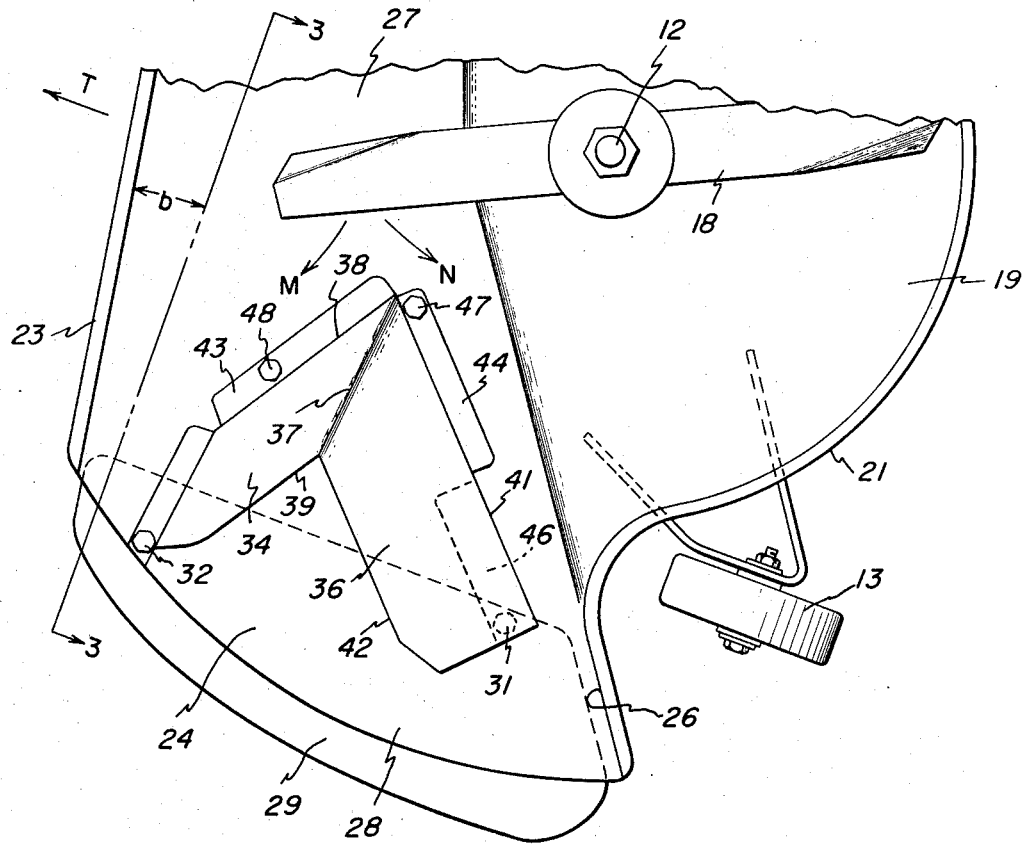
FIG. 2 is a bottom view of that part of the mower housing to which the guard plate is attached.

Referring to FIG. 2 the guard plate 33 together with the forward and rear walls 23 and 26 define a pair of diverging paths M and N along which the air flows to exit from the side openings on either side of the plate. The included lightweight grass clippings are easily projected outwardly along either of the diverging paths to be discharged from the housing. Heavier objects such as stone, nails, etc. will not follow the paths but will be projected against the guard plate 33 and thereafter be deflected to the ground below. Although a small portion of the grass clippings will be discharged from under the plate 33 and even heavier objects may be projected to a point outside the housing, the plate prevents high trajectory discharge of foreign objects and allows the high trajectory discharge of grass clippings. Further, the guard plate limits the operator's access to that portion of the chute in which the blade occupies.

What I claim as new and desire to secure by Letters Patent of the United States is:

1. A guard for a rotary power mower having a lateral discharge opening which permits the egress of grass clippings therefrom and prevents the ingress of an operator's apendages therein comprising:
    a. a housing having a discharge chute formed therein said chute defined by upper, front, and rear walls and having intake and discharge ends;
    b. at least one rotary cutting blade mounted on a vertical axis in the housing for rotation through said chute in a direction from said intake end toward said discharge end;
    c. a depending V-shaped guard plate secured to said chute upper wall near the discharge end thereof with the vertex of the V toward said intake end and the diverging ends of the V extending toward but not to the front and rear walls respectively, to thereby define a pair of diverging paths between the guard plate and said front and rear walls respectively, said paths providing for the conduction of lightweight grass clippings from said discharge end and obstructing the discharge of heavier objects therefrom.

2. A guard as set forth in claim 1 wherein the vertex of said V-shaped guard plate forms an acute angle with said chute upper wall in a direction toward said discharge end.

3. A guard as set forth in claim 1 wherein the sides of said V-shaped guard plate form an angle of substantially 90°.

4. A guard as set forth in claim 1 wherein said front and rear walls of said chute are divergent toward said discharge end.

5. A guard as set forth in claim 4 wherein said chute front wall is substantially a planar member which is canted rearwardly from the lateral plane towards its discharge end.

6. A guard as set forth in claim 4 wherein the angle of divergence of said rear wall from said front wall is greater near said discharge end than near said intake end.

7. A guard as set forth in claim 1 and including a pair of laterally spaced rotary blades wherein the ends of the blade nearer said chute intake end extend nearer to said chute front wall than the ends of the other blade.

* * * * *